US006571206B1

United States Patent
Casano et al.

(10) Patent No.: US 6,571,206 B1
(45) Date of Patent: May 27, 2003

(54) APPARATUS AND METHOD FOR EMULATING AN I/O INSTRUCTION FOR THE CORRECT PROCESSOR AND FOR SERVICING SOFTWARE SMI'S IN A MULTI-PROCESSOR ENVIRONMENT

(75) Inventors: Anthony Paul Casano, Felton, CA (US); David Steven Edrich, Santa Cruz, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/164,347

(22) Filed: Oct. 1, 1998

Related U.S. Application Data

(63) Continuation-in-part of application No. 09/007,539, filed on Jan. 15, 1998, now abandoned.

(51) Int. Cl.⁷ ................................................ G06F 9/44
(52) U.S. Cl. ........................ 703/25; 703/27; 710/260; 713/100
(58) Field of Search ............................. 703/26, 27, 25; 710/36, 40, 261, 260; 713/100, 300, 310, 320

(56) References Cited

U.S. PATENT DOCUMENTS

| | | | | |
|---|---|---|---|---|
| 5,721,931 A | * | 2/1998 | Gephardt et al. | 395/733 |
| 5,796,984 A | | 8/1998 | Pearce et al. | 395/500 |
| 5,889,978 A | * | 3/1999 | Jayakumar | 395/500 |
| 6,003,129 A | * | 12/1999 | Song et al. | 712/244 |
| 6,272,618 B1 | * | 8/2001 | Tyner et al. | 712/31 |
| 6,321,279 B1 | * | 11/2001 | Bonola | 7/36 |

FOREIGN PATENT DOCUMENTS

| | | |
|---|---|---|
| EP | 0 446 077 A | 9/1991 |
| EP | 0539 313 A | 4/1993 |

OTHER PUBLICATIONS

The TOPAZ Parallel Computing Facility, Ryosuke Itoh et al., Proceedings of the 1990 IEEE Nuclear Science Symposium, US, New York, vol. symp. 1, p. 346–349.

* cited by examiner

*Primary Examiner*—Samuel Broda
*Assistant Examiner*—T. Phan

(57) ABSTRACT

A method for controlling I/O in a multi-processor environment, comprising the steps of: determining if an I/O instruction requiring an interrupt is being executed by one of the processors in the multi-processor environment to transfer data or a command between the processor and an I/O device; performing an interrupt if such an I/O instruction is detected; determining which of the processors in the multi-processor environment is executing an I/O instruction; if only one of the processors is executing an I/O instruction, setting a Last Processor indicator designating that one processor as the processor executing the I/O instruction; and transferring data or a command between the processor designated in the Last Processor indicator and the I/O device in response to the I/O instruction. In a further aspect of the invention, a method is provided for servicing a software system management interrupt (SMI) initiated by an I/O instruction in a multi-processor environment, comprising the steps of: detecting the occurrence of a software SMI; determining which processor in the multi-processor environment has save state information indicating that that processor initiated the software SMI; and transferring information between an SMI handler and the processor determined to have initiated the software SMI.

34 Claims, 2 Drawing Sheets

APPARATUS AND METHOD FOR EMULATING AN I/O INSTRUCTION FOR THE CORRECT PROCESSOR AND FOR SERVICING SOFTWARE SMI'S IN A MULTI-PROCESSOR ENVIRONMENT

This is a Continuation-in-Part application of U.S. application Ser. No. 09/007,539, filed Jan. 15, 1998, abandoned.

FIELD OF THE INVENTION

The invention relates generally to the field of multi-processor computer systems, and more specifically, to the emulation of input or output data and the communication of and/or commands to or from a processor that is executing an I/O instruction directed to a specified I/O device in a multi-processor computer system environment.

This invention also relates generally to the field of SMI services and multi-Processor computer systems and specifically to the field of servicing Software SMI's.

BACKGROUND OF THE INVENTION

The modern computer architecture typically includes a set of hardware called Legacy Hardware. This Legacy Hardware is hardware that all applications, operating systems and BIOS (Basic Input/Output System firmware used to boot and to test the architecture as well as to provide run-time services) expect to be present in the computer system and expect to behave in the computer system in a prescribed way. To communicate with diverse hardware in a given architecture, a series of Input and Output instructions along with specified addresses and data values have been standardized. When removing or adding new hardware in the computer system, in order to allow all existing applications and operating systems software to make use of the new hardware without modification, the Input/Output instructions between the new hardware and the old system hardware typically require emulation, which is accomplished by dispatching the Input/Output instructions to a software emulation subroutine. This is also referred to as trapping. A specific example of hardware requiring an emulation operation is the Universal Serial Bus (USB) Legacy support system. The USB hardware in this support system adds to the overall computer system the following: A USB host controller, a root hub, a connector, interrupt generating mechanisms, and USB devices including a USB keyboard. For all existing applications and operating systems to take advantage of the USB keyboard, this keyboard at the Input/Output instruction level must be made to look like the original keyboard used with the Legacy Hardware, for example, a PS/2 keyboard. To emulate the PS/2 keyboard, a System Management Interrupt (SMI) is generated by trapping on the PS/2 keyboard controller Input/Output instructions. Within the SMI service routine, specific routines then translate the command/data from the Legacy Hardware format to USB keyboard command/data.

A fundamental problem results from the use of such interrupts in a multi-processor environment. This problem when interrupts are utilized, is to determine which processor in the multi-processor environment caused the instruction trap. The emulation of an IN instruction, for example, can cause significant problems if that command or data is not loaded into the proper register in the processor that initiated and executed the input instruction. Likewise, the emulation of an OUT instruction, although it will not cause corruption of registers in a processor, will cause incorrect data to be provided to the output device if the data is not received from the processor that executed the OUT instruction.

In a typical multi-processor architecture, if no changes are made to the I/O instruction emulation, the Boot Strapped Processor (BSP) will have one of its registers changed when one of the Application Processors in the multi-processor architecture performs an input instruction requiring emulation. This causes two problems: (1) the input instructions data is never received by the application processor that performed the input instruction; and (2) one of the Boot Strapped Processor's registers is inadvertently changed, which could have a disastrous effect.

Likewise, with no changes to the output instruction emulation, the emulation code would only get the output data from the Boot Strapped Processor, even if one of the Application Processors performed the output instruction. This causes two problems: (1) the Application Processor output instruction data will never be received by the output instruction emulation code; (2) one of the Boot Strapped Processor's registers will be used as the output instruction data which could put the emulated device into an undesirable state. The present invention is designed to solve both of these problems.

In general, modern CPU hardware such as the Intel Pentium includes a provision for a System Management Interrupt (SMI) signal. The interrupt is connected to an output pin from the computer system's chipset logic. When certain system hardware events occur, external to the CPU (s) of a system, such as chipset logic's programmable timers timing out, error conditions such as parity errors, low battery indications from external hardware, and particular BUS I/O cycle execution, the chipset logic will generate the software management interrupt (SMI) signal. This interrupt transfers CPU execution to a BIOS SMI interrupt handler for further processing, which is usually implemented by a software module.

In addition to pure hardware events, the SMI feature can also be invoked deliberately by software through the use of a software SMI procedure. In general, a software SMI procedure executes one or more I/O instructions that the chipset logic has been programmed to monitor. Upon detection that the I/O cycle has occurred, the chipset logic will generate the SMI signal to the SMI pin(s) of the CPU(s). The chipset logic in this situation is simply monitoring I/O Bus cycles (treating them as hardware events), and so has no knowledge which CPU actually generated the instruction.

In the case of SMI's generated by external hardware events, the state of the registers of the various CPU(s) of the system are largely irrelevant to the interrupt handling. The hardware event is CPU independent and the BIOS's SMI handler is simply given control to handle the hardware event and then, following the handling, it allows the system to resume it's normal processing. The CPU(s) themselves generally input no information and require no information to be passed back to them.

However, in the case of an SMI generated deliberately by software (S/W SMI), it is generally necessary to pass information into the SMI handler and to also get results back. For example, in the case of a software SMI used to enable a power management function, the results would be control information communicated to one or more registers in the particular CPU to power-up or power lower given pieces of equipment connected to that CPU. As another example, a software SMI may be generated in order to enable a MODEM, and the results to be communicated back to a register in the particular CPU is whether the MODEM was or was not enabled. As a yet further example, a software SMI may be generated in order to check a password, and the result to be communicated back by changing a register in the particular CPU is whether the entered password matches a stored set of accepted passwords.

In the case of a single CPU, results are passed by reading the standard CPU registers by the SMI handler and output is retrieved by changing these registers in the CPU upon resume. However, in the case of multiple CPUs a new problem arises because the individual CPU which generated the Software SMI has never been readily determinable and thus the CPU registers to read as input and to write data are not known.

With no changes to the software SMI functionality, the Boot Strapped Processor (BCP) will have its register used for any input and output changes when one of the Application Processor(s) (AP's) performs a software SMI. This causes two problems: 1) The Input Instruction's data is never received by the AP. 2) The BCP's registers were inadvertently changed which could have a disastrous effect. Support for multiple CPUs has never been performed.

SUMMARY OF THE INVENTION

Briefly, the present invention comprises a multi-processor system, including at least a first and a second processors, each capable of executing an I/O instruction to transfer data or a command between the processor and an I/O device; I/O and trap hardware for performing an interrupt on a plurality of the processors upon receipt of a selected I/O instruction from one of the processors and to transfer data or a command between the I/O device and the one of the processors; a first device for determining which of the processors are executing I/O instructions; a second device operating, when only one of the processors is executing an I/O instruction, to set a LastProcessor indicator designating the one processor as the processor executing an I/O instruction; and a third device for transferring data or a command between the processor indicated in the LastProcessor indicator and the I/O device in response to the selected I/O instruction.

In a further aspect of the present invention, the I/O and trap hardware comprises an emulation block for translating the data or command from one of the input device or processor to a different format compatible with the other of the input device or processor.

In a yet further aspect of the present invention, the first device for determining which of the processors is executing an I/O instruction comprises first circuitry for designating for each of a plurality of the processors, whether an instruction address count difference between an instruction address for an I/O instruction last performed by that processor and a current instruction address for that processor is less than or equal to a predetermined number, and using this designation in determining which of the processors are executing an I/O instruction.

In a yet further aspect of the present invention, the first circuitry includes logic to determine when the instruction address count difference for a particular processor is equal to one, and to delete the designation of that particular processor as a processor executing an I/O instruction unless the last I/O instruction for the particular processor designates directly or indirectly a port for the specific I/O device.

In a yet further aspect of the present invention, the predetermined number is 2.

In a yet further aspect of the present invention, each of the first and second processors includes a first logic to set a first indicator when it is executing an I/O instruction; and wherein the first device comprises a second logic to determine which of the processors have their first indicators set.

In yet a further aspect of the present invention, a method is provided for controlling I/O in a multi-processor environment, comprising the steps of: determining if an I/O instruction requiring an interrupt is being executed by one of the processors in the multi-processor environment to transfer data or a command between the processor and an I/O device; performing an interrupt if such an I/O instruction is detected; determining which of the processors in the multi-processor environment is executing an I/O instruction; if only one of the processors is executing an I/O instruction, setting a LastProcessor indicator designating that one processor as the processor executing the I/O instruction; and transferring data or a command between the processor designated in the LastProcessor indicator and the I/O device in response to the I/O instruction.

In yet a further aspect of the invention, a computer program product is provided comprising: a computer usable medium having computer readable program code means embodied therein for providing I/O functions between an appropriate processor in a multi-processor environment and an I/O device during an I/O trap, the computer readable program code means in the computer program product comprising first computer readable program code means for causing hardware to determine which processors in the multi-processor environment are executing an I/O instruction; second computer readable program code means for causing hardware to determine if only one of the processors in the multi-processor environment is executing an I/O instruction, an in that case, setting a LastProcessor indicator designating the one processor as the processor executing an I/O instruction; and third computer readable program code means for causing hardware to transfer data or a command between the processor designated by the LastProcessor indicator and the I/O device.

In a yet further aspect of the present invention, a multi-processor system is provided comprising at least a first and a second processor, each capable of executing an I/O instruction to transfer data or a command between the processor and an I/O device; an I/O and trap hardware for performing an interrupt on a plurality of the processors upon receipt of a selected I/O instruction from one of the processors and to transfer data or a command between the I/O device and the one of the processors; a first device for providing a designation, for each of a plurality of the processors whether an instruction address count difference between an instruction address for an I/O instruction last performed by that processor and the current instruction address for that processor are less than or equal to a predetermined number, and using this information in determining which of the processors to connect the I/O device to transfer data or a command between the I/O device and that processor in response to the I/O instruction, and making that connection.

In a yet further aspect of the present invention, a method for controlling I/O in a multi-processor environment is provided, comprising the steps of: determining if an I/O instruction requiring an interrupt is being executed by one of the processors in the multi-processor environment to transfer data or a command between the processor and an I/O device; performing an interrupt if such an I/O instruction is detected; providing a designation of which of the processors in the multi-processor environment has an instruction address count difference between an instruction address for an I/O instruction last performed by that processor and a current instruction address for that processor which is less than or equal to a predetermined number; and using that information in determining which processor to connect to the I/O device to transfer the data or command between the I/O device and the processor in response to the selected I/O instruction and making that connection.

In a further aspect of the present invention, a method for servicing a software system management interrupt (SMI) initiated by an I/O instruction in a multi-processor environment is provided, comprising the steps of: detecting the occurrence of a software SMI; determining which processor in the multi-processor environment has save state information indicating that that processor initiated the software SMI; and transferring information between an SMI handler and the processor determined to have initiated the software SMI.

In a further aspect of the present invention, the processor determining step comprises the step of determining if a processor in the multi-processor environment has an EIP' value in an interrupt save area equal to an offset location where an instruction which immediately follows an I/O call instruction that initiates software SMI's in a BIOS software SMI call routine exists.

In a yet further aspect of the present invention, the processor determining step comprises the step of determining if the EIP value in a processor I/O save state area equals an offset location at which an I/O call instruction that initiates software SMI's in a BIOS software SMI call routine exists.

In a further aspect of the present invention, a multi-processor system is provided, comprising: at least a first and a second processors, each capable of initiating a software-generated system management interrupt (SMI) by generating a particular I/O call instruction in a BIOS software SMI call routine; an SMI handler for processing system management interrupts; first logic for detecting the occurrence of a software SMI; second logic for determining, after the first logic has detected the occurrence of a software SMI, which processor in the multi-processor environment has save state information which indicates that processor as having initiated the software SMI; and third logic for transferring information between the SMI handler and the processor determined to have initiated the software SMI.

In a further aspect of the present invention, a computer program product is provided, comprising a computer usable medium having computer readable program code means embodied therein for determining which processor in a multi-processor environment initiated a software system management interrupt (SMI) and providing communication between an SMI handler and that processor, the computer readable program code means in the computer program product comprising: first computer readable program code means for detecting the occurrence of a software SMI; second computer readable program code means for designating, after the first computer readable program code means has detected the occurrence of a software SMI, which processor in the multi-processor environment has save state information which indicates that processor as having initiated the software SMI; and third computer readable program code means for transferring information between the SMI handler and the processor determined to have initiated the software SMI.

Is yet a further aspect of the present invention, a computer program product is provided, comprising: a computer usable medium having computer readable program code means embodied therein for determining which processor in a multi-processor environment initiated a software system management interrupt (SMI) and providing communication between an SMI handler and that processor, the computer readable program code means in the computer program product comprising: first computer readable program code means for detecting the occurrence of a software SMI; second computer readable program code means for designating, after the first computer readable program code means has detected the occurrence of a software SMI, a processor in the multi-processor environment as having initiated the software SMI if both of the following tests, in any order, are true:

1) the processor in the multi-processor environment has an EIP' value in an interrupt save state area equal to an offset location where an instruction which immediately follows an I/O call instruction that initiates software SMI's in a BIOS software SMI call routine exists, and 2) the EIP value in an I/O save state area for the processor equals an offset location at which an I/O call instruction that initiates software SMI's in the BIOS software SMI call routine exists; and transferring information between the SMI handler and the designated processor.

DETAILED DESCRIPTION OF THE PREFERRED EMBODIMENT

Figure 1:
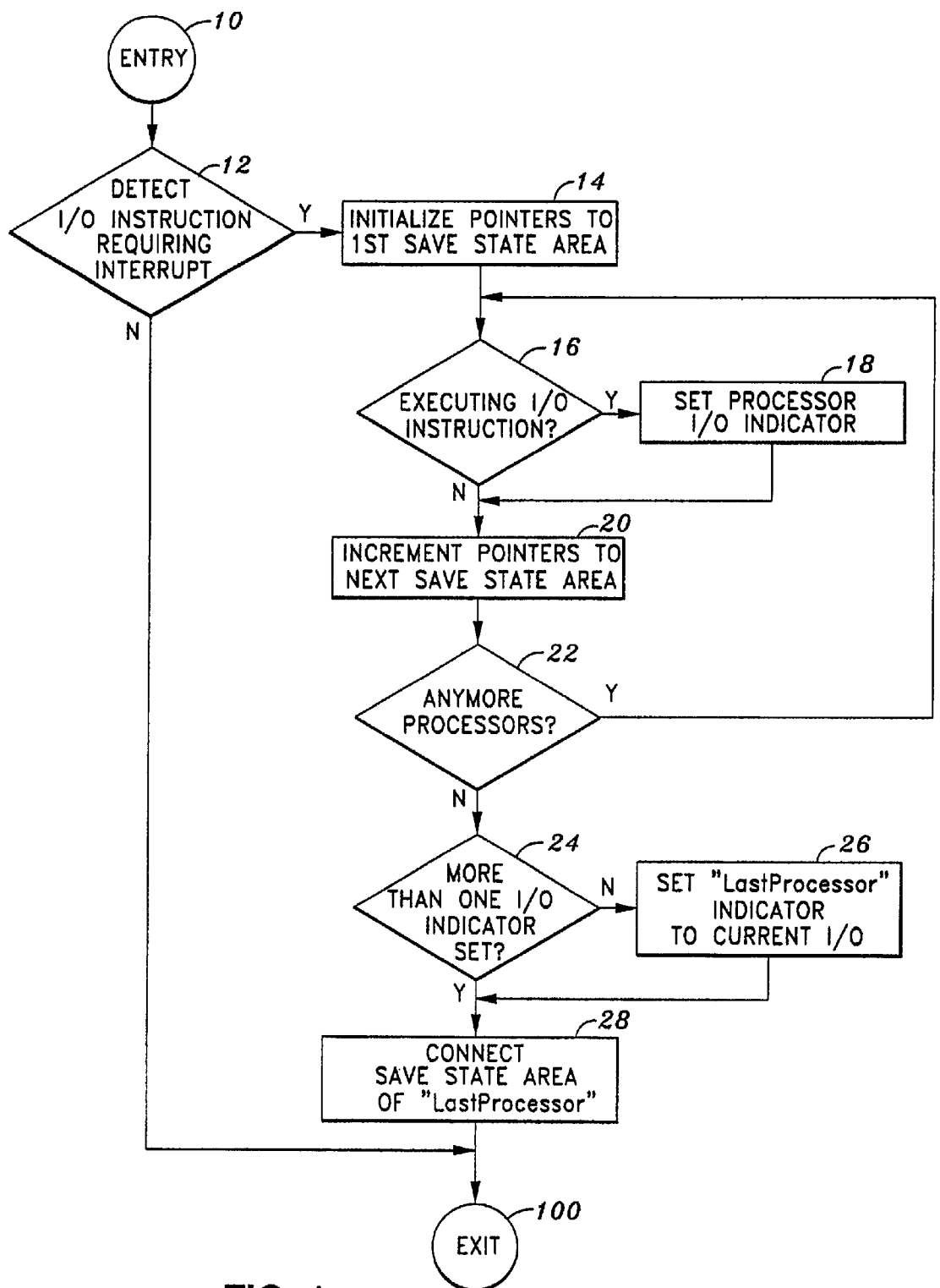
FIG. 1 is a block diagram flowchart showing the I/O instruction trap handling flow for the present invention.

The present invention will be described in the context of a specific embodiment, but the invention is not intended to be so limited. Note that although the invention is particularly useful for interrupts to facilitate an emulation, it has broad application to any type of interrupt, such as, for example, to store data, divert data, or divert program flow.

The present invention recognizes and makes use of a number of features in multi-processor environments. First, it has been recognized for the present invention that it is a rare event when more than one processor is executing an Input/Output instruction at the same time. In addition, it has been recognized that hardware control frequently cannot be moved from one processor to another in a casual manner. Additionally, it has been recognized for the present invention that hardware cannot have two Input/Output instructions operating simultaneously. The Input/Output Bus for a multi-processor system can only be accessed by one processor at a time. The other processors are held off until completion of the first Input/Output instruction. The present invention also makes use of knowledge that the Input instruction requiring an interrupt has already been executed. In one embodiment of the invention, the invention uses each processor's save state area to determine if this processor was issuing an Input/Output instruction. Finally, the invention uses a given processor's history to discriminate between multiple processors with pending Input/Output instructions.

By way of example, the present invention in one embodiment comprises the following steps:

(1) Determine that an I/O instruction requiring an interrupt is being executed.

(2) Perform an interrupt.

(3) Determine which of the processors in the multi-processor environment is executing an I/O instruction.

(4) If only one of the processors is executing an I/O instruction, setting a LastProcessor indicator designating that one processor as the processor executing the I/O instruction.

(5) Transferring data or a command between a processor designated in the LastProcessor indicator and the I/O device in response to the I/O instruction.

Referring now to each of these steps in more detail, the first step simply requires the use of typical trapping hardware to indicate that a trap event being monitored has occurred and to initiate an interrupt. As noted above, interrupts can be used to achieve a variety of different objectives. For example, in the case of USB Legacy Support Systems, the hardware will indicate that a Read of Port 60H has occurred. The Read of Port 60H indicates that the input port for the Legacy keyboard is being accessed. The detection of this event indicates that an I/O instruction (an input instruction in this case) is being executed by one of the processors in the multi-processor environment.

Likewise, in the context of the execution of an output instruction, an instruction or event that could be monitored is the instruction Write of Port 64H or Port 60H. Note that the Port 64H is the command port for the Legacy Keyboard Controller, while the Port 60H is the data port for the Legacy Keyboard Controller for an output or write command. Upon the detection of the particular event being monitored, such as the detection of the execution of the instruction Read of Port 60H or Write of Port 64H or Port 60H, an interrupt is initiated in the system. This interrupt could cause the program flow to be diverted based on the detection of this specific event. Alternatively, the interrupt could cause an emulation program subroutine to be performed. As noted previously, when inserting new equipment into Legacy systems, it is essential to provide an emulation of the input and output data and/or commands being transferred between the new I/O device and the Legacy system in order to facilitate proper communication. This emulation subroutine would typically simply comprise a translation subroutine for translating commands and data between two different formats.

Once the interrupt activity has occurred, the problem to be solved is determining which processor in the multi-processor environment executed the I/O instruction and should either receive the input command or data or have its output data or command sent to the I/O device. In order to accomplish this determination of the correct processor in a multi-processor environment, in one embodiment of the invention the save state operations, in a save state area such as a RAM either internal or external to the processor, during a trap are utilized. Specifically, a standard processor saves the state of the ECX, the ESI, the EDI, and EIP registers that were present during the execution of the last I/O instruction in that processor. The last I/O register states can be thought of as being saved in the Last I/O save area. The original rationale for saving the last I/O register state was to allow a re-start at the last I/O instruction, if desired.

Likewise, when an interrupt occurs, the states of the registers ECX, ESI, EDI, and EIP that were present at the start of the interrupt are saved in an area which may be considered to be the interrupt register save area.

It can been seen that in the normal operation of a processor that receives an I/O instruction that will cause an interrupt, the state of the registers ECX, ESI, EDI, and EIP are saved in the I/O save area upon receipt of the I/O instruction. A typical input instruction such as IN AL, Port 64H-a two BYTE instruction, instructs the processor to move the contents of the Port 64H of the I/O device into the processor register AL. Another typical input instruction has the form IN AL, DX, a one byte instruction, where DX contains the port address. Depending on the type of I/O instruction involved, the instruction link for the Port 64H will be multiple bytes long. In the example of a two byte input instruction, the processor will read both bytes of the instruction before the I/O management logic for the multi-processor system will detect that this is a monitored I/O instruction. Accordingly, the program will have stepped through two bytes to allow the processor to read the I/O instruction and to allow the I/O management system to detect that this is an I/O instruction that requires an interrupt, initiate an interrupt, and save the states of registers ECX, ESI, EDI, and EIP in the interrupt save state area. It can be seen that for the processor executing the I/O instruction, the instruction pointer or address for the instruction executed during the last I/O execution that is held in the Last I/O save state area, will differ from the next instruction pointer or address held in the interrupt save state area, by an amount that will be less than or equal to a predetermined number. This predetermined number will be, in this example, the maximum number of address bytes that the I/O device can have. In the present example of a two byte I/O port instruction, this predetermined number will be equal to 2. Accordingly, it can be seen that when the address difference between the Last I/O save state area holding the address for the last I/O instruction performed by the particular processor and the next instruction pointer held in the interrupt save state area is equal to 2, then it is clear that that particular processor is executing an I/O instruction. Note that in one example embodiment, the address held in the register EIP at the receipt of the I/O instruction is saved in the Last I/O save state area and subtracted/compared with the address held in the EIP register at the point of the interrupt, which address is held in the interrupt save state area. The difference between these two addresses is compared to the predetermined number, which in this example, is 2, i.e., EIP'=EIP+2, where EIP' is the register holding the next instruction pointer or address.

Alternatively, the I/O port address may be located in a register such as, for example, the register DX. The instruction in this example, would be a one byte instruction and would take the following form: IN AL, DX. In this situation, the instruction count difference between the instruction address held in the Last I/O save state area for the last I/O instruction executed and the next instruction pointer held in the interrupt save state area for that processor will be equal to 1, i.e., EIP' =EIP+1, where EIP'is the next instruction pointer held in the next instruction pointer location of the interrupt save state area.

When the instruction pointer count difference for the processor is equal to 1, then it is preferred to determine whether the port address held in the register DX is actually holding a designator or address for the I/O device that is being monitored, i.e., that required the interrupt. Thus, an additional step is performed, when the instruction address count difference for a particular processor is equal to 1, of deleting the designation of the particular processor as a processor executing an I/O instruction unless the last I/O instruction for the particular processor designates directly or indirectly a port for the I/O device being monitored.

It should be noted that there may be processor designs where the program does not have to be stepped through multiple bytes in order to read the I/O instruction before it is determined that an interrupt is necessary. In that case, the instruction count difference between an address held in the Last I/O save state area for the last I/O instruction performed by that processor and the current instruction pointer held in the interrupt save state area for that processor will be zero.

Accordingly, it can be seen from the above that the instruction pointer count difference in a particular processor when there is an I/O instruction being executed will be equal to the predetermined number or may be less than the predetermined number. In the example discussed, the instruction pointer count difference may be 2, 1, or 0. In the next step, if there is only one processor in the middle of an I/O instruction, then this processor must be the one that issued the I/O instruction and should be connected to communicate and transfer data and commands between the designated I/O device. Accordingly, a "LastProcessor" indicator is set to indicate this particular processor, and in the case of a read instruction, to update the information held in the save state area of this processor for the register AL. Alternatively, in the case of a write instruction, data or a command held in the interrupt save area for the register AL for this particular processor is sent to the appropriate port of the I/O device. In the situation where there are two or more processors in the middle of an I/O instruction, i.e., where the address difference between the instruction pointer held in the Last I/O save state area and the current instruction pointer held in the interrupt save state area for that processor is less than or equal to the predetermined number for two or more processors, then the "LastProcessor" indicator is not updated and the processor indicated currently in the "LastProcessor" indicator is connected to the I/O device for the transference of data or commands. In essence, this is a default situation where, in the face of 2 processors executing I/O instructions, it is assumed that the processor designated in the "LastProcessor" indicator is the correct processor for the communication. It should be noted that in the real world, this type of processor contention is a rare condition. In fact, a multi-processor operating system will usually assign a particular hardware to a specific processor. If during the execution of the very first input instruction requiring an interrupt there are 2 or more processors in the middle of an I/O instruction, then the "LastProcessor" indicator will be equal to zero. Accordingly, neither processor's save state area is connected to the I/O device. This condition will never exist in a BIOS which only runs one processor during Power On Self Test (POST), since the "LastProcessor" indicator will have to be set to the only processor that is running.

Note that the "LastProcessor" indicator may comprise a register pointer indicating the particular processor that was the last processor, or may comprise a plurality of flags, with a flag being set for each processor. The "LastProcessor" indicator could be disposed in the I/O management system, or the processor chip set, or could be external to the processor chip set.

Referring to FIG. 1, a flowchart showing the program flow for one embodiment of the present invention is set forth. From the entry point 10 the system monitors in diamond block 12 for I/O instructions requiring an interrupt. If no I/O instruction is detected requiring an interrupt, then the system flow goes directly to the exit point 100. Alternatively, when an I/O instruction requiring an interrupt is detected, then the values in the appropriate registers including the register EIP are saved in the interrupt save area for each processor. At this point the instruction pointer count difference is determined for each processor in the multi-processor system. Accordingly, in block 14 the pointers are initialized in the save state area for the first processor to be reviewed. The program flow then moves to the diamond 16 wherein it is determined whether that particular processor is executing an I/O instruction. As noted previously, for a preferred embodiment of the present invention, that diamond decision block function 16 may be accomplished by determining the address count difference between the instruction pointer held in the Last I/O save state area and the current instruction address held in the current instruction address pointer in the interrupt save area for that processor is less than or equal to a predetermined number. In the present example, this predetermined number is equal to 2, but in other examples, will depend on the particular type of processors being utilized. In a further aspect of this embodiment, when the address count difference for the particular processor is equal to one, then this processor will not be designated as a particular processor executing an I/O instruction unless the instruction pointer for the last I/O instruction for the particular processor points to a location holding a designator for the I/O device being monitored.

If the diamond 16 determines that this processor is executing an I/O instruction, then an I/O indicator for that processor is set. This indicator may comprise a flag or a pointer, by way of example. The program flow then goes to the block 20 to increment the pointers to the save state area of the next processor to be reviewed. Then the program flow goes to the diamond 22 where it is determined whether any more processors need to be reviewed. If a further processor needs to be reviewed, then the program flow is sent back to the input to the diamond block 16 to determine whether this further processor is executing an I/O instruction as discussed above. If no further processors need to be reviewed to determine whether they are executing I/O instructions, then the program flow goes to the diamond block 24 to determine if more than one processor has an I/O indicator set, meaning that more than one processor is in the middle of executing an I/O instruction. If there is not more than one processor executing an I/O instruction, then the "LastProcessor" indicator is updated to indicate that processor. Then the program flow goes to the block 28 to connect the save state area of the "LastProcessor" and the selected I/O device. In the case of an IN instruction, the save state area holding the value for the AL register for the "LastProcessor" is updated with the data or command from the particular I/O device. Alternatively, in the case of an OUT instruction, the data or command held in the save state for the register AL of the "LastProcessor" is sent to the particular I/O device.

When the diamond block 24 determines that there is more than one processor executing an I/O instruction, then the "LastProcessor" indicator is not updated, but rather the program flow goes directly to the block 28 to connect the save state area of the processor indicated in the non-updated "LastProcessor" indicator to permit communication to the particular I/O device. This is the default situation. The output from the block 28 then goes to the exit point 100 from the program flow.

Note that although the present embodiment of the invention described herein used the save state areas in the SMRAM, the invention is not so limited. For example, the save state information could be stored in standard system memory.

In yet a further aspect of the invention designed to solve the problem of determining the CPU that caused a software SMI, the invention makes use of (1) the fact that the BIOS should be the only agent that generates S/W SMI's and (2) the CPU state information preserved in each processor's Save State area, particularly the information contained in the save states' EIP' and IO EIP slots. The invention also is completely compatible with the existing software SMI services that work on current Operating Systems. No new interfaces need be defined.

The detection procedure to determine the processor which generated S/W SMI follows these steps:

1) Determine that this SMI was a software SMI.
2) Determine which processor's save state has the expected information to conclude that it generated the S/W SMI.

To take each of these steps in greater detail, the first step simply uses the chipset logic registers to determine that the source of a particular SMI was software. By way of example, logic may be set up to indicate when a software event being monitored has occurred and then placing a "1" in a particular register to indicate that occurrence.

The second step makes use of the fact that the BIOS is the only agent capable of generating software SMI's. This should be clear because the SMI handler which processes SMI's is created by the BIOS. Thus, any call routine for initiating a software SMI must follow a format determined by the BIOS. Secondly, a call routine for initiating a software SMI is machine specific, which means for any generic application software to make use of a software SMI, that software must access a machine level procedure which then must be in BIOS.

The second step accomplishes its determination function by looking into each CPU's save state area to determine if the particular CPU was executing out of the BIOS software SMI call routine, which routine includes the I/O instruction which generates the software SMI. The save state contains the key pieces of information which can determine if the processor was at that location, prior to SMI, and therefore had generated the software SMI. Two pieces of data are used to make the tests. Either test may be used with some level of accuracy, to determine if that CPU is executing a software SMI. If both tests are true, then the level of accuracy is substantially 100%.

Test 1 determines if the EIP' value in the interrupt state area equals the offset location of the instruction immediately following the I/O call instruction in the BIOS software SMI call routine which sends the execution to the SMI handler. As noted previously, the EIP' register in the interrupt save state area holds the location of the next instruction to be executed, when the interrupt occurs. Offset, in this context, means a relative position.

Note that the BIOS software SMI call routine must contain at least two instructions, comprising an I/O call instruction for sending the execution to the SMI handler routine to perform the SMI, and an immediately following instruction. By way of example, but not by way of limitation, the immediately following instruction could send the execution back to the application program which was running in the CPU before the occurrence of the software SMI.

Test 2 makes use of the fact that when a CPU starts executing an Input/Output (I/O) instruction, it saves the state of the ECX, ESI, EDI, and EIP registers in a location in the save state area different from the interrupt save state area, namely the I/O save state area. As noted previously, this is done so that an Input/Output instruction can be restarted if desired. This I/O save state information is used to determine if the Processor's last executed Input/Output instruction is from the I/O instruction used to generate the software SMI. If the I/O save state value for EIP equals the offset location at which the I/O call instruction in the BIOS software SMI call routine, which instruction sends the execution to the SMI handler, exists.

Note that if both of these tests are positive, then it is conclusive that this CPU had just generated the S/W SMI. The odds that more than 1 CPU at the time of a software SMI will pass both of these tests at random are greater than 2^32. (If a system was left on continuously and software SMI's were being generated every 2 seconds, it would on average take over 100 years for an error condition to occur.) This is less likely than many other system failure events so as to be considered solid. Note that where both tests are positive, the interrupt save state register ECX, ESI and EDI should also be equal to their I/O save state equivalents in the I/O save state for that CPU.

Figure 2:
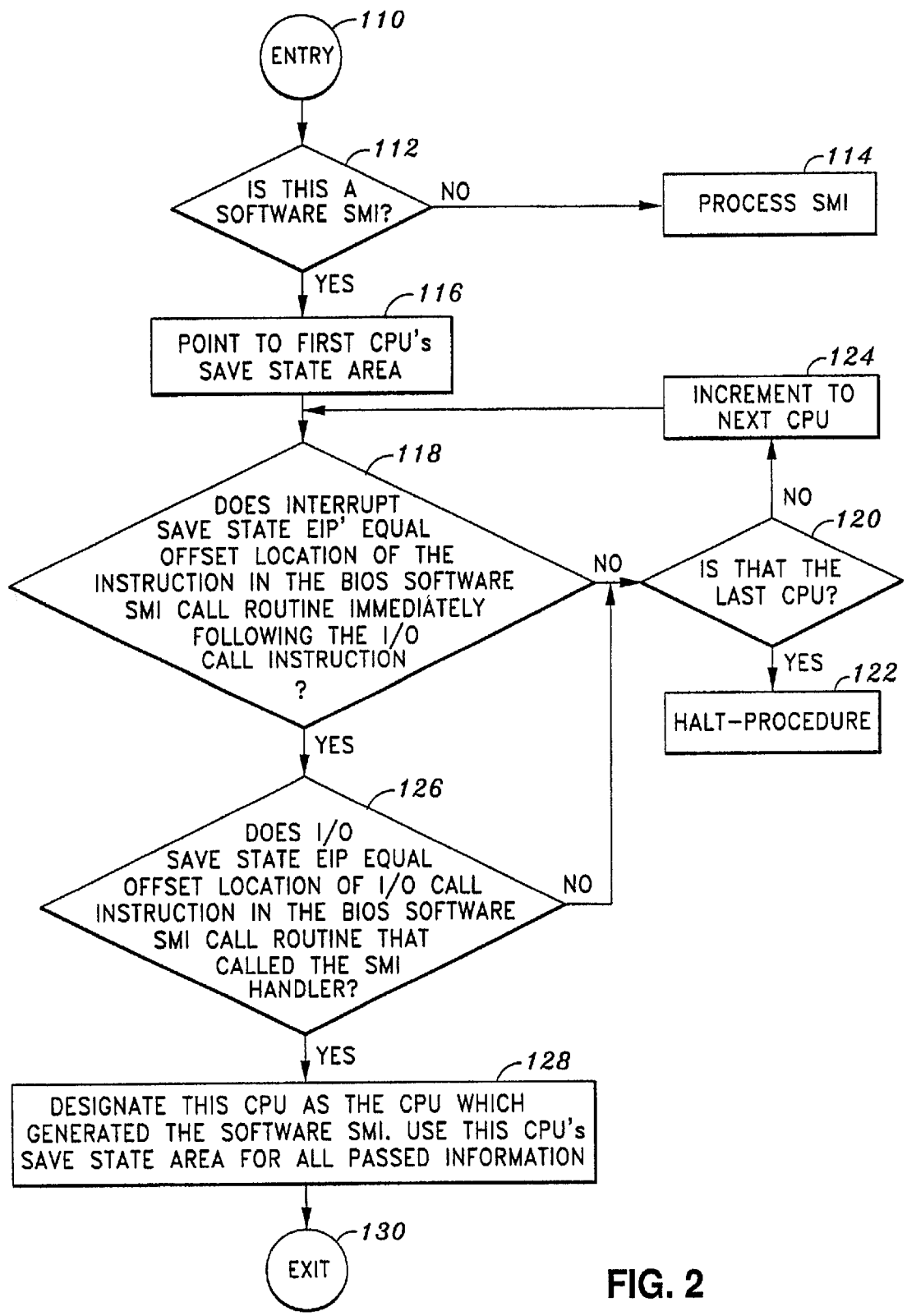
FIG. 2 is a block diagram flowchart showing the processor determination after a software SMI in a multi-processor environment.

Referring now to FIG. 2, there is shown a block diagram flow chart showing the process of the determination after a software SMI in a multi-processor environment, in accordance with an embodiment of the present invention. Note that this figure illustrates a preferred embodiment of the present invention wherein both tests are utilized to make a determination as to which processor initiated the software SMI. As stated previously, the present invention could be implemented using only one of these test in order to make the processor determination. Referring now to FIG. 2, the execution begins at an entry point illustrated by block 110. Block 110 indicates the point in the execution where an SMI has been issued. The next step in this process, illustrated by block 112, is to determine whether the SMI is a software SMI. If it is determined that this is not a software SMI, then the execution proceeds to block 114 and the SMI is processed like a normal hardware SMI. Alternatively, if it is determined that this is a software SMI, then the execution proceeds to block 116, which points to the first CPU's save state area. The execution then proceeds to block 118, wherein it is determined whether the interrupt save state EIP' value equals the offset location of the instruction in the BIOS software SMI call routine immediately following the I/O call instruction. If the answer is NO, then the execution proceeds to block 120, wherein it is determined whether this is the last CPU to be tested. If the answer is YES, then the execution proceeds to block 122 wherein this procedure is halted. If it is determined that this is not the last CPU, then the execution proceeds to block 124, to increment to the next CPU. Then the execution proceeds again to block 118 to determine if the interrupt save state EIP' value for that next CPU equals the offset location of the instruction in the BIOS software SMI call routine immediately following the I/O call instruction.

If the answer to the determination in block 118 is that the interrupt save state EIP' does equal the offset location of the instruction in the BIOS software SMI call routine immediately following the I/O call instruction, then the execution proceeds to be block 126. Block 126 performs the second test by determining whether the I/O save state EIP equals the offset location of the I/O call instruction in the BIOS software SMI call routine that called the SMI handler. If the answer to this determination is YES, then the execution proceeds to block 128, which designates this CPU as the CPU which generated the software SMI. Information is then communicated between the SMI handler and that CPU's save states. The execution then proceeds to block 130 which exits the routine.

Alternatively, if the determination in block 126 is NO, that the I/O save state EIP does not equal the offset location of the I/O call instructions in the BIOS software SMI call routine, then the execution proceeds to block 120. Block 120 determines whether this is the last CPU to be queried. The execution then proceeds as discussed previously.

It should be noted that although that the preferred embodiment has been described utilizing the sequence of the test in block 118, namely does the interrupt save state EIP' equal the offset location of the instruction in the BIOS software SMI call routine immediately following the I/O call instruction, followed by the test in block 126, namely does the I/O save state EIP equal the offset location of the I/O call instruction in the BIOS software SMI call routine, the invention is not so limited. Specifically, these tests could be interchanged, so that the test in block 126 could occur before the test set forth in block 118.

This invention allows for the ability to use software SMI's in a multi-Processor environment. Multi-Processor environments are important to achieve more CPU throughput for individual systems and servers. The need to have software SMI's functional on this class of systems is important, particularly for system designers that incorporate special added-value features that require software SMI's and for multi-processor systems that use Operating System directed power management.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and a practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multi-processor system, comprising:
   a plurality of processors, each capable of executing an I/O instruction to transfer data or a command between the plurality of processors and an I/O device;
   I/O and trap hardware for performing an interrupt on the plurality of processors upon receipt of a selected I/O instruction from one of the plurality of processors and to transfer data or a command between the I/O device and said one of the plurality of processors;
   a first device for determining which of the plurality of processors is an executing processor, where the executing processor is executing the selected I/O instruction, said first device to utilize a save state area for each of the plurality of processors;
   a second device operating, when only one of the plurality of processors is executing an I/O instruction, to set a LastProcessor indicator designating which of the plurality of processors is the executing processor; and
   a third device for transferring data or a command between the executing processor indicated in the LastProcessor indicator and the I/O device in response to the selected I/O instruction.

2. A multi-processor system, as defined in claim 1, wherein the I/O and trap hardware comprises an emulation block for translating the data or command from one of the I/O device and executing processor to a different format compatible with the other of the I/O device and executing processor.

3. A multi-processor system, as defined in claim 1, wherein the first device for determining which of the processors is executing the selected I/O instruction comprises first circuitry for designating for each of the plurality of processors, whether an instruction address count difference between an instruction address for an I/O instruction last performed by a particular processor and a current instruction address for the particular processor is less than or equal to a predetermined number, and using this designation in determining which of the plurality of processors is the executing processor, said instruction address to be held in said save state area for each of said plurality of processors.

4. A multi-processor system, as defined in claim 3, wherein the first circuitry includes logic to determine when the instruction address count difference for the particular processor is one, and to delete the designation of the particular processor as the executing processor unless the last I/O instruction for the particular processor designates directly or indirectly a port for the I/O device.

5. A multi-processor system as defined in claim 3, wherein the predetermined number is two.

6. A multi-processor system as defined in claim 1, wherein each of the plurality of processors includes a first logic to set a first indicator when it is executing an I/O instruction; and
   wherein the first device comprises a second logic to determine which of the plurality of processors have their first indicators set.

7. A method for controlling I/O in a multi-processor environment, comprising:
   determining if an I/O instruction requiring an interrupt is being executed by one of a plurality of processors in the multi-processor environment to transfer data or a command between the one of the plurality of processors and an I/O device;
   performing an interrupt if the I/O instruction is detected;
   determining which of the plurality of processors in said multi-processor environment is an executing processor by utilizing a save state area of each of the plurality of processors, where the executing processor is executing the I/O instruction;
   if only one of the plurality of processors is executing the I/O instruction, setting a LastProcessor indicator designating which of the plurality of processors is the executing processor; and
   transferring data or a command between the executing processor designated in the LastProcessor indicator and the I/O device in response to the I/O instruction.

8. A method as defined in claim 7, further comprising translating the data or command to be transferred to a different format compatible with a device that receives the data or command.

9. A method as defined in claim 7, wherein determining which of the processors in said multi-processor environment is the executing processor comprises determining which of the processors in said multi-processor environment is the executing processor by designating for each of the plurality of the processors whether an instruction address count difference between an instruction address for an I/O instruction last performed by that processor and the current instruction address for that processor is less than or equal to a predetermined number, and using this information in determining which of the processors are executing an I/O instruction.

10. A method as defined in claim 9, further comprising, when the instruction address count difference for a particular processor is equal to one, deleting the designation of the particular processor as the executing processor unless the last I/O instruction for the particular processor designates directly or indirectly a port for the I/O device.

11. A computer program product, comprising:
   a computer usable medium having computer readable program code embodied therein for providing I/O functions between an appropriate processor in a multi-processor environment and an I/O device during an I/O interrupt, the computer readable program code in the computer program product comprising
   first computer readable program code to determine which of a plurality of processors in the multi-processor environment are executing an I/O instruction said first computer readable program code to utilize a save state area for each of the plurality of processors;

second computer readable program code to determine if only one of the plurality of processors in the multi-processor environment is executing the I/O instruction, and in that case, setting a LastProcessor indicator designating the one processor as the processor executing the I/O instruction; and third computer readable program code to transfer data or a command between the processor designated by the LastProcessor indicator and the I/O device.

12. A computer program product as defined in claim 11, wherein the first computer readable program code includes fourth computer readable program code for determining for each of the plurality of the processors whether an instruction address count difference between an instruction address for an I/O instruction last performed by that processor and the current instruction address for the processor are less than or equal to a predetermined number, and using that information in determining which of the processors are executing the I/O instruction.

13. A computer program product as defined in claim 12, wherein the first computer readable program code includes fifth computer readable program code for determining when the instruction address count difference for a particular processor is equal to one, and deleting the designation of the particular processor as the processor executing the I/O instruction unless the last I/O instruction for the particular processor designates directly or indirectly a port for the I/O device.

14. A computer program product as defined in claim 11, wherein the predetermined number is 2.

15. A multi-processor system, comprising:
a plurality of processors, each capable of executing an I/O instruction to transfer data or a command between the plurality of processors and an I/O device;
an I/O and trap hardware that issues an interrupt on the plurality of processors upon receipt of a selected I/O instruction from one of the plurality of processors and to transfer data or a command between the I/O device and said one of the plurality of processors; and
a first device that provides a designation, for each of the plurality of processors, whether an instruction address count difference between an instruction address for an I/O instruction last performed by that processor and a current instruction address for that processor is less than or equal to a predetermined number, and using that information to determine which of the plurality of processors to connect to the I/O device to transfer the data or command between the I/O device and said one of the plurality of processors in response to the selected I/O instruction and making that connection.

16. A multi-processor system, as defined in claim 15, further including logic to delete the designation of a particular processor as having an instruction count difference of less than or equal to the predetermined number when the instruction address count difference for the particular processor is equal to one, unless the last I/O instruction for the particular processor designates directly or indirectly a port for the I/O device.

17. A method for controlling I/O in a multi-processor environment, comprising:
determining if an I/O instruction requiring an interrupt is being executed by one of a plurality of processors in the multi-processor environment to transfer data or a command between the one of the plurality of processors and an I/O device;
performing an interrupt if the I/O instruction is detected;
providing a designation for each of the plurality of processors in the multi-processor environment whether an instruction address count difference between an instruction address for an I/O instruction last performed by that processor and a current instruction address for that processor is less than or equal to a predetermined number; and, using said designation for each of the plurality of processors to determine which of the plurality of processors to connect to the I/O device to transfer the data or command between the I/O device and said one of the plurality of processors in response to the selected I/O instruction and making that connection.

18. A method as defined in claim 17, further comprising deleting the designation of a processor as having an instruction count difference of less than or equal to the predetermined number when the instruction address count difference for a particular processor is equal to one, unless the last I/O instruction for the particular processor designates directly or indirectly a port for the I/O device.

19. A computer program product, comprising:
a computer usable medium having computer readable program code embodied therein for providing I/O functions between an appropriate processor in a multi-processor environment and an I/O device during an I/O interrupt, the computer readable program code in the computer program product comprising
first computer readable program code to provide a designation for each of a plurality of the processors in the multi-processor environment whether an instruction address count difference between an instruction address for an I/O instruction last performed by that processor and a current instruction address for that processor is less than or equal to a predetermined number; and
second computer readable program code to use said designation for each of the plurality of processors in determining which processor to connect to the I/O device to transfer the data or command between the I/O device and the appropriate processor and to make this connection.

20. A computer program product as defined in claim 19, wherein the first computer readable program code includes third computer readable program code to determine when the instruction address count difference for a particular processor is equal to one, and to delete the designation of the particular processor as a processor executing an I/O instruction unless the last I/O instruction for the particular processor designates directly or indirectly a port for the I/O device.

21. A method for servicing a software system management interrupt (SMI) initiated by an I/O instruction in a multi-processor environment, comprising:
detecting the occurrence of the software SMI;
determining which processor in said multi-processor environment has save state information relating to the I/O instruction indicating that that processor initiated the software SMI; and
transferring information between an SMI handler and said processor determined to have initiated the software SMI.

22. A method as defined in claim 21, wherein determining which processor in said multi-processor environment has save state information comprises determining which processor in said multi-processor environment has an EIP' value in an interrupt save state area equal to an offset location where an instruction which immediately follows an I/O call instruction that initiates software SMI's in a BIOS software SMI call routine exists.

23. A method as defined in claim 22, wherein determining which processor in said multi-processor environment has save state information further comprises determining if the EIP value in a processor I/O save state area equals an offset location at which an I/O call instruction that initiates software SMI's in a BIOS software SMI call routine exists.

24. A method as defined in claim 21, wherein determining which processor in said multi-processor environment has save state information comprises determining if the EIP value in a processor I/O save state area equals an offset location at which an I/O call instruction that initiates software SMI's in a BIOS software SMI call routine exists.

25. A method as defined in claim 24, wherein determining which processor in said multi-processor environment has save state information further comprises determining if ECX, ESI and EDI values in said processor I/O save state equal the ECX, ESI, and EDI values in an interrupt save state area.

26. A method for servicing a software system management interrupt (SMI) initiated by an I/O instruction in a multi-processor environment, comprising the steps of:
 detecting the occurrence of a software SMI;
 designating a processor in said multi-processor environment as having initiated the software SMI if both of the following tests, in any order, are true: 1) the processor in said multi-processor environment has an EIP' value in an interrupt save state area equal to an offset location where an instruction which immediately follows an I/O call instruction that initiates software SMI's in a BIOS software SMI call routine exists, and 2) an EIP value in an I/O save state area for the processor equals an offset location at which an I/O call instruction that initiates software SMI's in said BIOS software SMI call routine exists; and
 transferring information between said SMI handler and said designated processor.

27. A multi-processor system, comprising:
 at least a first and a second processors, each capable of initiating a software-generated system management interrupt (SMI) by generating an I/O call instruction in a BIOS software SMI call routine;
 an SMI handler for processing system management interrupts;
 first logic for detecting the occurrence of a software SMI;
 second logic to determine, after said first logic has detected the occurrence of a software SMI, which processor in said multi-processor environment has save state information relating to the I/O call instruction which indicates that processor as having initiated the software SMI; and
 third logic to transfer information between said SMI handler and said processor determined to have initiated the software SMI.

28. A multi-processor system as defined in claim 27, wherein said second logic includes third logic for determining if a processor in said multi-processor environment has an EIP' value in an interrupt save area equal to an offset location where an instruction which immediately follows an I/O call instruction that initiates software SMI's in said BIOS software SMI call routine exists.

29. A multi-processor system as defined in claim 28, wherein said second logic includes fourth logic for determining if an EIP value in a processor I/O save state area equals an offset location at which an I/O call instruction that initiates software SMI's in said BIOS software SMI call routine exists.

30. A multi-processor system as defined in claim 27, wherein said second logic includes fourth logic for determining if an EIP value in a processor I/O save state area equals an offset location at which an I/O call instruction that initiates software SMI's in said BIOS software SMI call routine exists.

31. A computer program product, comprising a computer usable medium having computer readable program code embodied therein to determine which processor in a multi-processor environment initiated a software system management interrupt (SMI) by generating a particular I/O instruction and to provide communication between an SMI handler and that processor, the computer readable program code in the computer program product comprising:
 first computer readable program code to detect the occurrence of a software SMI;
 second computer readable program code to designate, after said first computer readable program code means has detected the occurrence of a software SMI, which processor in said multi-processor environment has save state information relating to the particular I/O instruction which indicates that processor as having initiated the software SMI; and
 third computer readable program code to transfer information between said SMI handler and said processor determined to have initiated the software SMI.

32. A computer program product as defined in claim 31, wherein said second computer readable program code means comprises code for determining if a processor in said multi-processor environment has an EIP' value in an interrupt save state area equal to an offset location where an instruction which immediately follows an I/O call instruction that initiates software SMI's in a BIOS software SMI call routine exists.

33. A computer program product as defined in claim 31, wherein said second computer readable program code means comprises code for determining if an EIP value in a processor I/O save state area equals an offset location at which an I/O call instruction that initiates software SMI's in a BIOS software SMI call routine exists.

34. A computer program product, comprising:
 a computer usable medium having computer readable program code means embodied therein for determining which processor in a multi-processor environment initiated a software system management interrupt (SMI) and providing communication between an SMI handler and that processor, the computer readable program code means in the computer program product comprising:
  first computer readable program code means for detecting the occurrence of a software SMI;
  second computer readable program code means for designating, after said first computer readable program code means has detected the occurrence of a software SMI, a processor in said multi-processor environment as having initiated the software SMI if both of the following tests, in any order, are true:
   1) the processor in said multi-processor environment has an EIP' value in an interrupt save state area equal to an offset location where an instruction which immediately follows an I/O call instruction that initiates software SMI's in a BIOS software SMI call routine exists, and
   2) the EIP value in an I/O save state area for the processor equals an offset location at which an I/O call instruction that initiates software SMI's in said BIOS software SMI call routine exists; and
    transferring information between the SMI handler and said designated processor.

* * * * *